(12) United States Patent
Schandel

(10) Patent No.: US 11,753,196 B2
(45) Date of Patent: Sep. 12, 2023

(54) VACUUM SEALER AND METHOD OF SEALING SAME

(71) Applicant: Hamilton Beach Brands, Inc., Glen Allen, VA (US)

(72) Inventor: David Matthew Schandel, Mechanicsville, VA (US)

(73) Assignee: Hamilton Beach Brands, INC., Glen Allen, VA (US)

( * ) Notice: Subject to any disclaimer, the term of this patent is extended or adjusted under 35 U.S.C. 154(b) by 0 days.

(21) Appl. No.: 17/521,105

(22) Filed: Nov. 8, 2021

(65) Prior Publication Data

US 2022/0144468 A1    May 12, 2022

Related U.S. Application Data

(60) Provisional application No. 63/112,197, filed on Nov. 11, 2020.

(51) Int. Cl.
*B65B 31/00* (2006.01)
*B65B 31/06* (2006.01)
*B65B 51/14* (2006.01)

(52) U.S. Cl.
CPC .............. *B65B 31/00* (2013.01); *B65B 31/06* (2013.01); *B65B 51/146* (2013.01)

(58) Field of Classification Search
CPC ......... B65B 31/00; B65B 31/04; B65B 31/06; B65B 51/146
USPC .................................................... 53/434, 512
See application file for complete search history.

(56) References Cited

U.S. PATENT DOCUMENTS

| 4,561,925 | A |   | 12/1985 | Skerjanec |
|---|---|---|---|---|
| 4,583,347 | A | * | 4/1986 | Nielsen ................. B65B 31/024 |
|   |   |   |   | 53/512 |
| 5,048,269 | A |   | 9/1991 | Deni |
| 5,352,323 | A |   | 10/1994 | Chi |
| 5,528,880 | A | * | 6/1996 | Landolt ................... B65B 31/02 |
|   |   |   |   | 53/434 |
| 5,784,862 | A | * | 7/1998 | Germano .............. B65B 31/046 |
|   |   |   |   | 53/512 |
| 5,894,929 | A |   | 4/1999 | Kai et al. |
| 6,256,968 | B1 |   | 7/2001 | Kristen |
| 6,460,443 | B1 |   | 10/2002 | Hsiao |
| 6,827,243 | B1 |   | 12/2004 | Nuzzolese |

(Continued)

FOREIGN PATENT DOCUMENTS

| CN |       2635530 Y | 8/2004 |
|---|---|---|
| CN |    101033014 A | 9/2007 |

(Continued)

*Primary Examiner* — Stephen F. Gerrity
(74) *Attorney, Agent, or Firm* — Alexander D. Raring

(57) ABSTRACT

A vacuum sealer includes: a housing comprising a vacuum chamber therein; a vacuum pump in fluid communication with the vacuum chamber; a sealing mechanism adjacent a periphery of the vacuum chamber; a valve positioned and configured to releasably seal the vacuum chamber, the valve movable between a first position, in which the valve forms a seal with the sealing chamber, and a second position, in which the valve does not form a seal with the sealing chamber; and a controller operatively connected with the vacuum pump, the sealing mechanism, and the valve. The controller is configured to move the valve from the first position to the second position during sealing.

14 Claims, 3 Drawing Sheets

(56) References Cited

U.S. PATENT DOCUMENTS

| | | | |
|---|---|---|---|
| 7,490,452 B2 | 2/2009 | Alipour | |
| 7,534,039 B2 | 5/2009 | Wu | |
| 9,499,288 B2 | 11/2016 | Cannon, Jr. | |
| 9,994,342 B2* | 6/2018 | Furuse et al. | B65B 51/146 |
| 2005/0205455 A1 | 9/2005 | Harrison | |
| 2007/0199283 A1* | 8/2007 | Sung et al. | B65B 31/046 |
| | | | 53/512 |
| 2009/0260325 A1* | 10/2009 | Haering et al. | B65B 31/024 |
| | | | 53/434 |
| 2016/0325864 A1* | 11/2016 | Hammad | B65B 31/024 |
| 2019/0055042 A1* | 2/2019 | Leppert et al. | B65B 51/146 |

FOREIGN PATENT DOCUMENTS

| | | | |
|---|---|---|---|
| CN | 103339033 A | | 10/2013 |
| CN | 106256691 A | | 12/2016 |
| CN | 210047811 U | | 2/2020 |
| DE | 202008008451 U1 | * | 10/2008 |
| JP | 05051014 A | * | 3/1993 |
| JP | H10236428 A | * | 9/1998 |
| JP | 2019151372 A | * | 9/2019 |
| KR | 20020028937 A | * | 4/2002 |
| KR | 20060091448 A | * | 8/2006 |
| KR | 100818627 B1 | * | 4/2008 |
| WO | 2007091822 | | 8/2007 |

\* cited by examiner

VACUUM SEALER AND METHOD OF SEALING SAME

RELATED APPLICATION

The present application claims priority from and the benefit of U.S. Provisional Patent Application No. 63/112,197, filed Nov. 11, 2020, the disclosure of which is hereby incorporated herein by reference in its entirety.

FIELD

The present invention relates generally to small appliances, and more particularly to vacuum sealer appliances.

BACKGROUND

Vacuum sealers are small appliances, generally utilized to vacuum (i.e., evacuate or otherwise withdraw air from) and seal polymeric or plastic vacuum bags (generally referred to herein as bags) containing foodstuffs for longer term storage while preserving freshness. Vacuum sealers may include a vacuum chamber and a vacuum pump for pumping air out of the open end of a bag, and an elongated heat sealing bar to seal the open end once the air has been pumped out of the bag.

The bags may be formed from a roll of bag stock that has two opposing side edges that are factory-sealed. A desired length of bag stock can be cut off the roll, such that the cut bag stock may have two opposing sealed side edges and at least one open end. Foodstuff items may be placed in the bag and the edge of the open end of the bag may be positioned within the vacuum chamber. The vacuum pump may be activated to create a vacuum in the vacuum chamber and the air may be vacuumed out of the bag. When the air has been evacuated from the bag, the open end of the bag may be sealed by the heat sealing bar.

When attempting to seal wet or moist items or liquids, some of the liquid in the bag might be vacuumed out of the bag along with the air. The escaping liquid is undesirable, as the liquid is pulled into the vacuum chamber (which can create a mess that is difficult to clean up), onto the sealing surface of the bag (which can prevent a good heat seal), and/or into the vacuum pump (which can damage the vacuum pump). As such, it may be desirable to provide alternative techniques for vacuum sealing.

SUMMARY

As a first aspect, embodiments of the invention are directed to a vacuum sealer comprising: a housing comprising a vacuum chamber therein; a vacuum pump in fluid communication with the vacuum chamber; a sealing mechanism adjacent a periphery of the vacuum chamber; a valve positioned and configured to releasably seal the vacuum chamber, the valve movable between a first position, in which the valve forms a seal with the sealing chamber, and a second position, in which the valve does not form a seal with the sealing chamber; and a controller operatively connected with the vacuum pump, the sealing mechanism, and the valve. The controller is configured to move the valve from the first position to the second position during sealing.

As a second aspect, embodiments of the invention are directed to a method of vacuum sealing a bag comprising the steps of:

a) positioning an edge of a bag to be sealed in a vacuum chamber of a vacuum sealer;

b) applying a vacuum to the bag through the vacuum chamber;

c) sealing a first portion of the edge of the bag with the vacuum sealer;

d) opening a valve in the vacuum chamber to release a vacuum in the vacuum chamber; and e) sealing a second portion of the edge of the bag to complete sealing after step d) is performed.

DETAILED DESCRIPTION

Figure 1:
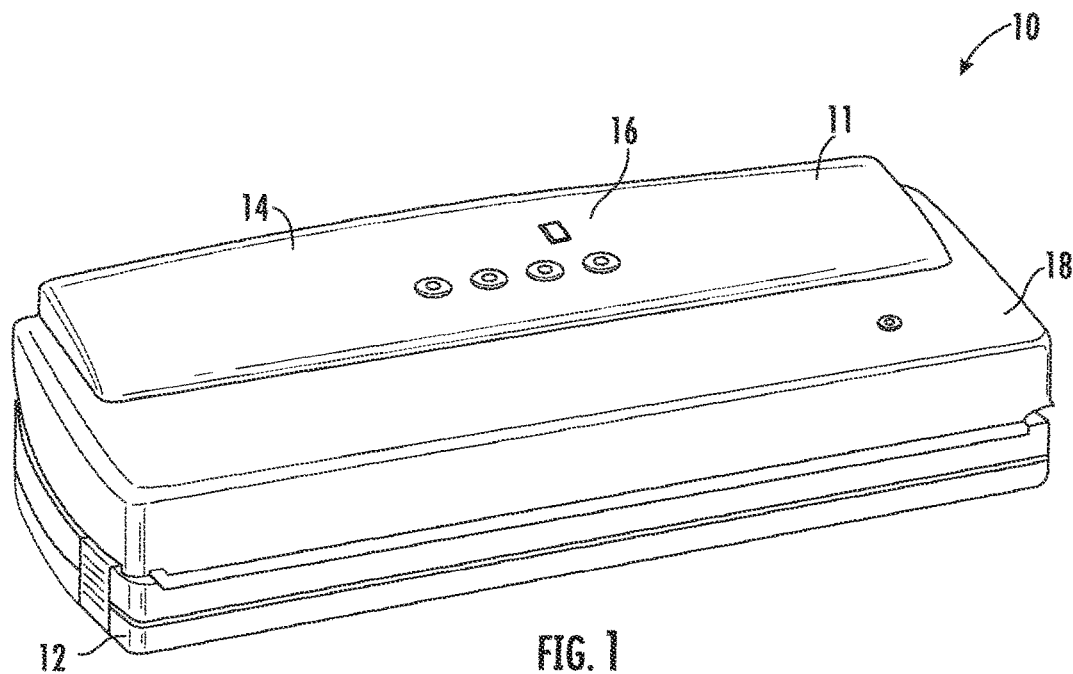
FIG. 1 is a front, top perspective view of a vacuum sealer, with the lid closed, according to some embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Some embodiments of the present invention may arise from recognition that, in a vacuum sealer that can evacuate air from and seal vacuum bags containing fluids (e.g., liquid contents and/or wet or moist items), it may be beneficial to release the vacuum on the bag prior to the bag being completely sealed. More particularly, embodiments of the present invention are directed to opening a valve (such as a solenoid valve) in the vacuum chamber prior to the complete sealing of the bag. Releasing the vacuum in this manner can prevent the flow of liquid into the vacuum chamber.

Figure 2:
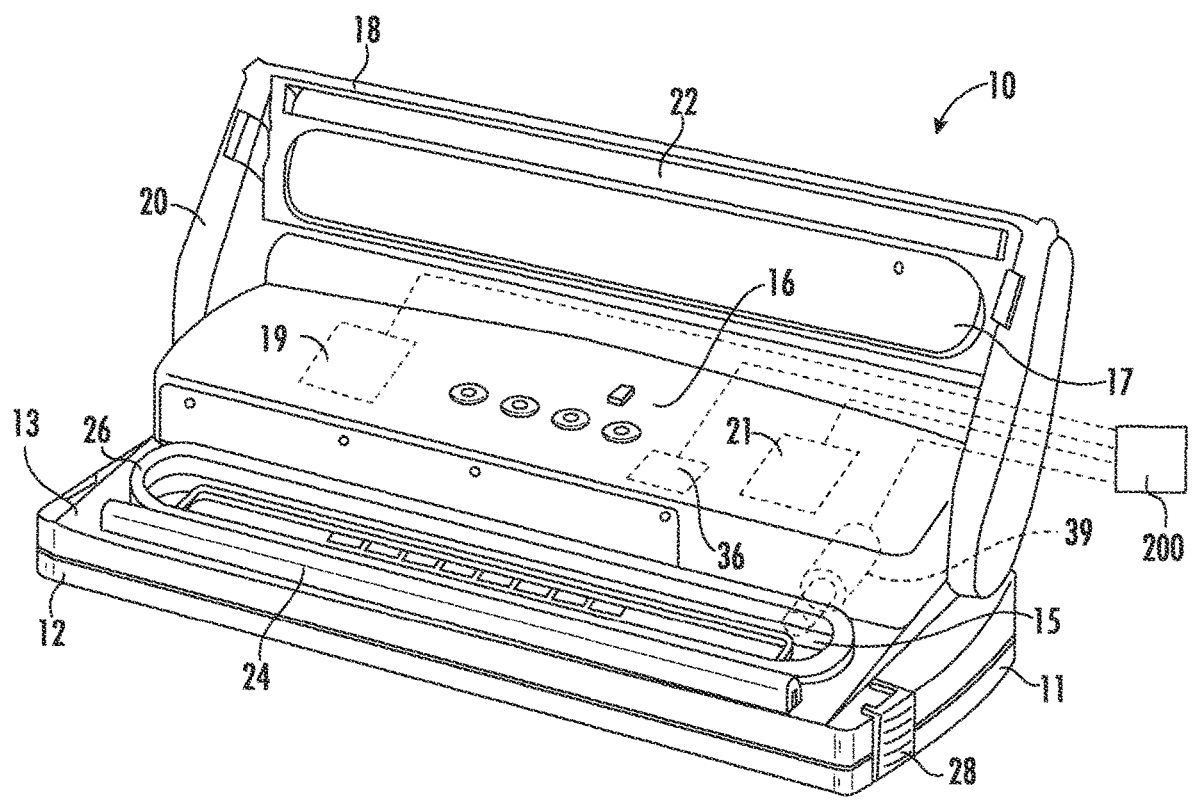
FIG. 2 is a front, top perspective view of the vacuum sealer of FIG. 1, with the lid open.

Referring now to the drawings, FIG. 1 is a front, top perspective view of a vacuum sealer device or apparatus (also referred to herein as a vacuum sealer), with the lid closed, according to some embodiments of the present invention. FIG. 2 is a front, top perspective view of the vacuum sealer of FIG. 1, with the lid open. Referring now to FIGS. 1 and 2, the vacuum sealer 10 includes a housing 11 with an upper portion 14 and a lower portion 12 that is adapted to rest on a support surface (such as a countertop) during use. The lower portion 12 has a top surface 13, as shown in FIG. 2. The upper portion 14 includes a user interface or control panel 16 that is configured to receive inputs from a user to control operations of the vacuum sealer 10. The vacuum sealer 10 also has a lid 18 pivotably attached to the housing 11. The lid 18 is movable between a closed position (seen in FIG. 1) in which the lid 18 is covering at least a portion of the top surface 13 of the lower portion 12, and an open position (seen in FIG. 2) that exposes the top surface 13 of the lower portion 12. The lid 18 may be supported by opposing arms 20 pivotally attached to the lower portion 12. The top surface 13 of the lower portion 12 defines a first cavity 15 and the lid 18 defines an opposing second cavity 17 in an underside of the lid 18. The first cavity 15 and the second cavity 17 together in the closed position of the lid 18 form a sealed vacuum chamber 26 therebetween.

The control panel 16 is operatively connected with a controller 200 and includes one or more input elements (buttons, switches, knobs, etc.) and/or one or more output elements (alphanumeric displays, lights, buzzers, etc.). In some embodiments, the control panel 16 may include a touchscreen display that provides both input and output elements. A sealing mechanism (illustrated as a sealing bar) 22 is secured on the underside of the lid 18, although it could be located in the lower portion 12 or other suitable location adjacent a periphery of the vacuum chamber 26. The sealing bar 22 may include one or more heating ribbons that heat up when electricity is applied (also referred to herein as energizing or energization) during a sealing operation to heat seal an opening of a bag. The corresponding top surface 13 of the lower portion 12 may have a thermally insulating backing strip 24 that is positioned such that a bag is sandwiched between the sealing bar 22 and the thermally insulating backing strip 24 when the lid 18 is in the closed position. In an alternate embodiment, the thermally insulating backing strip 24 is located in the lid 18, while the sealing bar 22 is located in the corresponding top surface 13 of the lower portion 12 of the housing 11.

The vacuum chamber 26 is configured to seal around the open end of a polymeric or plastic bag (such as the bags shown in FIG. 4A or 4B) when the lid 18 is in the closed position. During operation of the vacuum sealer 10, air is vacuumed out of the vacuum chamber 26, which in turn vacuums air out of the interior of the bag via the open end. A vacuum pump 21 (shown in phantom line in FIG. 2) is housed inside the housing 11, and is in fluid communication with the vacuum chamber 26 to withdraw air from the vacuum chamber 26 and create a vacuum therein when energized by a power supply 19 (shown in phantom line in FIG. 2). The sealed vacuum chamber 26 is configured to hold the open end of the bag between the first and second cavities 15, 17, as the power supply 19 energizes the vacuum pump 21 to withdraw air from the bag. A latch 28 is provided to secure the lid 18 in the closed position during operation of the vacuum sealer 10. In some embodiments, the suction provided by the vacuum pump 21 may be sufficient to hold the lid 18 in the closed position during operation to maintain the seal between the first and second cavities 15, 17 of the vacuum chamber.

The vacuum chamber 26 may include one or more sensors 36 (shown in phantom line in FIG. 2) that are configured to output respective signals that can be converted to or are otherwise indicative of a vacuum level in the vacuum chamber 26. For example, the sensor(s) 36 may include a current sensor that is electrically coupled to the vacuum pump 21, and/or pressure sensor that is positioned in the vacuum chamber 26 or is in fluid communication with the vacuum chamber 26 (e.g., mounted to a printed circuit board that is connected to the vacuum chamber 26 by a port). The current sensor 36 may be configured to output a signal indicative of the current draw responsive to operation of the vacuum pump 21. The pressure sensor 36 may be configured to output a voltage signal based on the vacuum level in the vacuum chamber 26 responsive to operation of the vacuum pump 21.

The sealing mechanism or bar 22 may include a heating ribbon or other heating element having one or more segments along a length of the sealing bar 22, which may correspond to a dimension of the open end of a vacuum bag. With multiple segments, the segments may be activated serially or in parallel to seal different portions of the open end of a bag at different times, e.g., such that a portion of the open end of the bag can be initially sealed and the remainder of the open end of the bag can be subsequently sealed. For example, some embodiments may begin sealing a portion of the bag by activating one or more of the heating ribbon segments before or as the vacuum pump 21 is energized to withdraw air from the bag, and may begin sealing a remaining portion of the bag (for instance, a shorter portion) by activating one or more of the remaining heating ribbon segments responsive to identifying the transition in the rate of change of the vacuum level as described herein to complete the sealing. That is, the heating element may include multiple segments, which may be energized in sequence responsive to identifying the transition. Ends of the sealing bar 22 may be electrically connected to the power supply 19 to provide electricity to the heating ribbon(s). The electrical connection at one or more ends of the heating ribbon may be spring-loaded to allow the ribbon to expand/contract during heat cycling.

Figure 2A:
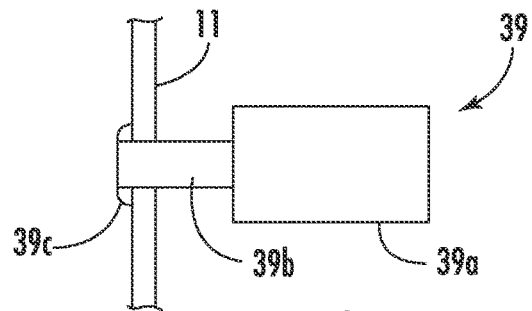
FIG. 2A is a schematic side view of a solenoid valve employed in the vacuum sealer of FIG. 1, shown in the retracted position.
Figure 2B:
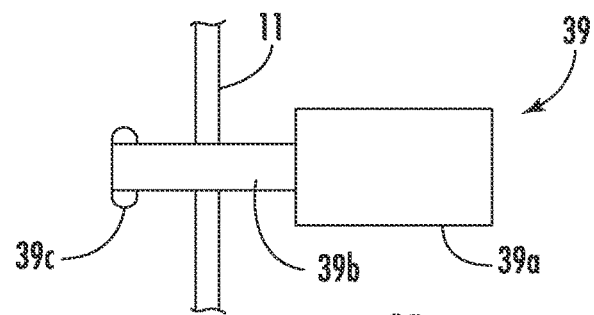
FIG. 2B is a schematic side view of the solenoid valve of FIG. 2A shown in the extended position.

Referring still to FIG. 2 and referring also to FIG. 2A, the vacuum sealer 10 includes a solenoid valve 39 within the housing 11. In the illustrated embodiment, the solenoid valve 39 includes a sleeve 39a and a plunger 39b that can retract into and extend from the sleeve 39a. A sealing element 39c may be attached to the free end of the plunger 39b. As shown in FIG. 2A, the plunger 39b extends through the wall of the housing 11 and into the first cavity 15. In the retracted position of FIG. 2A, the plunger 39b is at least partially retracted into the sleeve 39a such that the sealing element 39c forms a seal with the wall of the housing 11, with the result that the vacuum chamber 26 remains sealed. In the extended position of FIG. 2B, the plunger 39b is extended away from the sleeve 39a sufficiently that the sealing element 39c does not form a seal with the wall of the housing 11, with the result that the vacuum chamber 26 is not sealed and is open to the atmosphere.

The power supply 19, the vacuum pump 21, any sensors 36, and the solenoid valve 39 are operatively connected with the controller 200, which receives signals and/or controls the operation of these components.

In some embodiments, the vacuum sealer 10 may further include a plastic roll compartment housing and storing a roll of plastic bag stock therein, from which the vacuum bags can be dispensed. For example, the plastic roll compartment may be is located within the lower housing 12 (e.g., accessible by a pivotable door) in order to accommodate/cradle the roll of plastic bag stock. The bag stock may have two opposing side edges that are factory sealed. A desired length of bag stock can be cut off the roll (for example, by a cutting mechanism in the plastic roll compartment), such that the cut bag stock defining the vacuum bag has two opposing sealed side edges, e.g., left and right sides, and at least one open end.

Figures 4A, 4B:
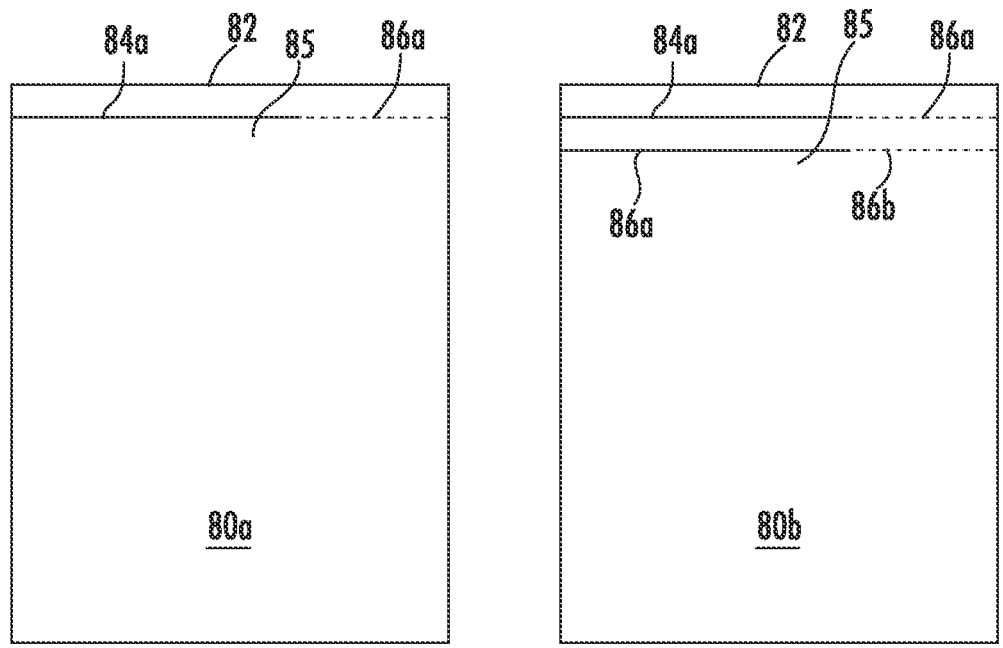
FIGS. 4A and 4B are top plan views of exemplary vacuum bags according to some embodiments of the present invention.

FIGS. 4A and 4B are top plan views of exemplary vacuum bags 80a and 80b (generally referred to herein as "80") according to some embodiments of the present invention. Referring now to FIG. 4A, a polymeric bag 80a has an open end 82 at which a seal 84a, 86a may be created by energizing the sealing mechanism 22 responsive to detection of a change in the vacuum level in accordance with embodiments described herein, thereby sealing contents of the bag 80a in a portion 85. As shown in FIG. 4B, an alternate bag 80b having an open end 82 including two parallel seals 84a, 86a and 84b, 86b that may be created by energizing the sealing mechanism 22 responsive to detecting a transition in the rate of change in the vacuum level in accordance with embodiments described herein. A portion of the seal(s) 84a and/or 86b may be created prior to energizing the vacuum pump 21, and a remaining portion 86a and/or 84b (as indicated by dashed lines) may be sealed responsive to responsive to detecting the transition in the rate of change of the vacuum level in some embodiments.

Figure 5:
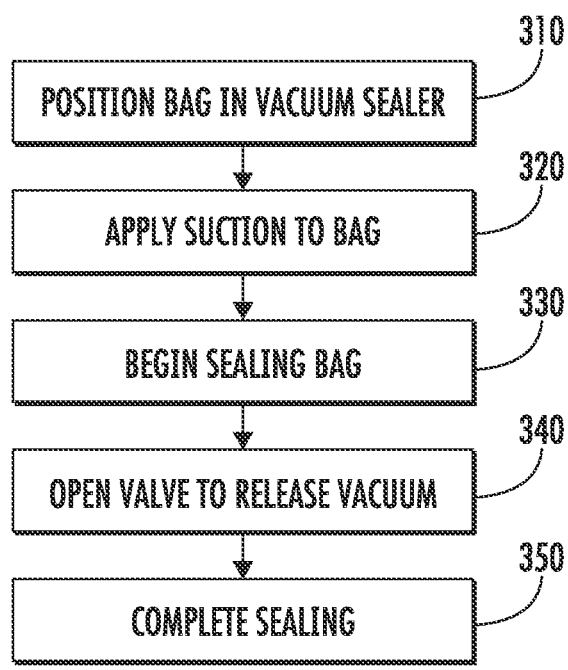
FIG. 5 is a flow chart illustrating exemplary operations of the vacuum sealer of FIG. 1.

In operation, the user positions a bag 80a, 80b in place in the vacuum sealer (Block 310 of FIG. 5). Initially the solenoid valve 39 is in its retracted position, with the sealing element 39c providing a seal with the wall of the housing 11, so that the vacuum chamber 26 is indeed airtight. The vacuum pump 21 is energized by the power supply 19 to draw out air from the polymeric bag 80 via the open end 82 thereof and through the aperture within the vacuum chamber 26 (Block 320). To seal the open end of the bag 80, the sealing bar 22, including one or more heating ribbons, is then energized for a prescribed time and/or to a prescribed temperature to seal the portion of the bag 80 pressed between the sealing mechanism 22 and the backing strip 24 (Block 330).

As discussed above, when a bag 80 contains a liquid, there is a risk that, as little to no air remains in the bag 80, liquid may be drawn into the vacuum chamber 26. To avoid this undesirable result, at a designated point during the sealing process, the solenoid valve 39 may be moved from its retracted position to its extended position, with the sealing element 39c positioned away from the wall of the housing 11. This movement causes the vacuum chamber 26 to release its vacuum (Block 340). As a result, liquid is not drawn into the vacuum chamber 26, and sealing can be completed (Block 350) without liquid being drawn into the vacuum chamber 26.

The action of the solenoid valve 39 described above can be initiated in a number of different ways. In some embodiments, it may be initiated after a predetermined duration has elapsed from the commencement of sealing. In other embodiments, action of the solenoid valve 39 may be triggered by the detection of a certain pressure by the pressure sensor 36. In embodiments in which a two-step sealing process is followed, extension of the solenoid valve 39 may begin when the second step in the sealing process occurs, or it may begin after a certain time period (e.g., 0.1-1 second) after the second sealing step has begun. Those of skill in this art will appreciate that other triggering actions may be employed.

It should also be noted that, although the solenoid valve 39 is illustrated and described herein, other configurations may be suitable. For example, in some embodiments the solenoid valve 39 may be mounted in the upper portion 14 of the vacuum sealer 11 rather than in the lower portion 12, in which case the solenoid valve 39 access the vacuum chamber 26 via the second cavity 17. The position of the solenoid valve 39 shown in FIG. 2 is illustrative only; the solenoid valve 39 may be positioned anywhere that provides access to the vacuum chamber 26. Further, the solenoid valve 39 may be configured so that the plunger 39b retracts into the sleeve 39a (rather than extending) to release the vacuum in the vacuum chamber 26. Moreover, another variety of valve (e.g., a flapper valve, a ball valve, etc.) may be employed in place of the solenoid valve 39.

Figure 3:
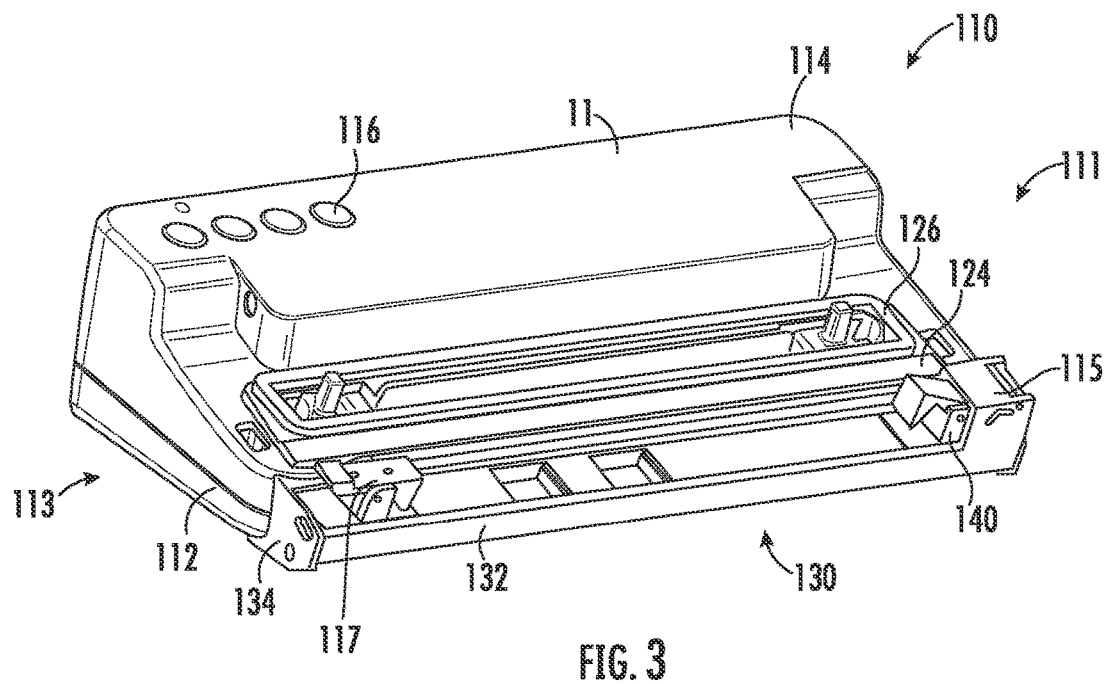
FIG. 3 is a front, top perspective view of a vacuum sealer, according to further embodiments of the present invention.

FIG. 3 is a front, top perspective view of a vacuum sealer 110 according to further embodiments of the present invention, which may provide improved positioning of a bag for vacuuming and sealing as the lid is closed. The lid is removed in FIG. 3 to more clearly illustrate the mechanism for improved bag positioning. As shown in FIG. 3, the vacuum sealer 110 includes a housing 11 with a lower portion 112 adapted to rest on a support surface (such as a countertop) during use, an upper portion 114, a control panel 116, and a lid. A vacuum chamber 126 seals around the open end of the bag when the lid is in the closed position. A sealing bar is positioned on the underside of the lid, so as to be positioned adjacent a periphery of the vacuum chamber 126 when the lid is in the closed position. The top surface of the lower portion 112 has a thermally insulating backing strip 124 that is positioned such that a polymeric or plastic bag is sandwiched between the sealing bar and the thermally insulating backing strip 124 when the lid is in the closed position. In an alternate embodiment, the thermally insulating backing strip 124 is located in the lid, while the sealing bar is located in the corresponding top surface of the lower portion 112 of the housing. During operation of the device, air is vacuumed out of the vacuum chamber 126, which in turn vacuums air out of the bag via the open bag end.

The vacuum sealer 110 further includes a bag holding mechanism 130 that is affixed to or integral with the lower portion 112. The bag holding mechanism 130 includes a main body 132, having a first end 111 and a second end 113, affixed to the lower portion 112 via opposing end brackets 134. The bag holding mechanism 130 further includes two clamps for holding a bag in place, either of which may be fixed or movable in a lateral direction. For example, the first or right side clamp, which is part of a first latch mechanism 115 movably disposed on the first end 111 of the main body 132, may be movable laterally along a carriage 140 that slides along the main body 132 such that the distance between the first latch mechanism 115 and the second latch mechanism 117 can be adjusted. The second clamp, which is part of a second latch mechanism 117 disposed proximate to the second end 113 of the main body 132 in line with the first latch mechanism 115, may be fixed so as not to permit lateral movement. The first and second clamps 115 and 117 are pivotably mounted on respective mounts so as to be movable between respective open and closed positions, so as to retain a bag placed in a correct or desired position for vacuuming/sealing thereunder when in the closed positions. The first clamp 115 may be biased outwardly to apply tension to the bag to help remove wrinkles for better sealing of the bag.

Like the vacuum sealer 10, the vacuum sealer 110 may include a solenoid valve or other valve for releasing the vacuum within the vacuum chamber 126 prior to the conclusion of sealing.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A vacuum sealer, comprising:
   a housing comprising a vacuum chamber therein;
   a vacuum pump in fluid communication with the vacuum chamber;
   a sealing mechanism adjacent a periphery of the vacuum chamber;
   a valve positioned and configured to releasably seal the vacuum chamber, the valve movable between a first position, in which the valve forms a seal with the vacuum chamber, and a second position, in which the valve does not form a seal with the vacuum chamber; and
   a controller operatively connected with the vacuum pump, the sealing mechanism, and the valve, the controller configured to move the valve from the first position to the second position during sealing by the sealing mechanism.

2. The vacuum sealer defined in claim 1, wherein the sealing mechanism is a two-step sealing mechanism.

3. The vacuum sealer defined in claim 2, wherein the controller is configured to move the valve from the first position to the second position after the first step of two-step sealing is completed.

4. The vacuum sealer defined in claim 1, wherein the sealing mechanism is a one-step sealing mechanism.

5. The vacuum sealer defined in claim 4, wherein the controller is configured to move the valve from the first position to the second position without sealing by the sealing mechanism being interrupted.

6. The vacuum sealer defined in claim 1, wherein the valve is a solenoid valve.

7. The vacuum sealer defined in claim 1, wherein the controller moves the valve from the first position to the second position based on a predetermined pressure measurement.

8. The vacuum sealer defined in claim 1, wherein the controller moves the valve from the first position to the second position based on the passage of a predetermined duration from the onset of sealing by the sealing mechanism.

9. A method of vacuum sealing a bag, comprising the steps of:
   a) positioning an edge of a bag to be sealed in a vacuum chamber of a vacuum sealer having a sealing mechanism;
   b) applying a vacuum to the bag through the vacuum chamber;
   c) sealing a first portion of the edge of the bag with the sealing mechanism;
   d) opening a valve in the vacuum chamber to release the vacuum in the vacuum chamber; and
   e) sealing a second portion of the edge of the bag with the sealing mechanism to complete sealing after step d) is performed.

10. The method defined in claim 9, wherein steps c) and e) are interrupted.

11. The method defined in claim 9, wherein steps c) and e) proceed continuously.

12. The method defined in claim 9, wherein the valve is a solenoid valve.

13. The method defined in claim 9, wherein step d) begins based on a predetermined pressure measurement.

14. The method defined in claim 9, wherein step d) begins based on the passage of a predetermined duration from the initiation of either step b) or step c).

* * * * *